United States Patent Office 3,294,690
Patented Dec. 27, 1966

3,294,690
COMPLEX METAL HALOCYANURATE
BLEACH COMPOSITIONS
Edwin A. Matzner, St. Louis, Mo., assignor to Monsanto
Company, St. Louis, Mo., a corporation of Delaware
No Drawing. Filed June 22, 1965, Ser. No. 465,840
9 Claims. (Cl. 252—99)

The present application is a continuation-in-part of parent application Serial No. 221,307, filed September 4, 1962.

The present invention relates to novel chlorocyanurate compounds and to methods of preparing such compounds. The invention further relates to a novel class of complex compounds which contain certain alkali metals and divalent metals as well as available chlorine and which have unusual resistance to loss of such chlorine. The present invention also relates to formulations or compositions containing the novel compounds of this invention, which formulations have improved stability relative to retention of available chlorine and which may be used, for example, in bleaching, oxidizing, sterilizing or disinfecting operations.

Trichlorocyanuric acid, dichlorocyanuric acid and certain metal salts, such as the sodium and potassium salts, of dichlorocyanuric acid are known and have been widely employed in bleaching, laundering and dishwashing compositions. However, these known chlorocyanurates have certain disadvantages in that when they are incorporated in such compositions containing alkaline inorganic salts, they often lose or tend to lose available chlorine. Such loss often results in undesirable odor formation and in reduced bleaching and laundering efficiency of the compositions.

It is one object of the present invention to provide novel chlorocyanurate compounds.

It is another object of the invention to provide processes for producing such novel chlorocyanurate compounds.

It is a further object of this invention to provide formulations and compositions containing such novel chlorocyanurate compounds, which formulations and compositions have exceptional stability with reference to retention of available chlorine.

Other objects and advantages of the present invention will become apparent from the following description and appended claims.

The present invention provides, in part, a class of novel complex metal halocyanurate compounds having the general formula

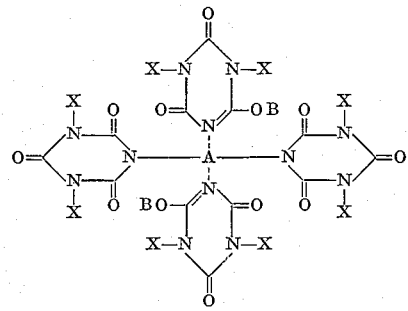

where A is magnesium or zinc, B is potassium or rubidium and X is a halogen atom such as bromine, chlorine, fluorine and iodine or mixtures thereof, but is preferably bromine or chlorine, and more preferably is chlorine. Such compounds exist in the hydrate or anhydrous forms and when in the hydrated state are crystalline solids. When in the anhydrous state these compounds are usually noncrystalline amorphous solids. Generally the complex halocyanurate compounds such as bromo-, fluoro- and iodo-cyanurates tend to be less stable than the corresponding complex chlorocyanurate compounds.

A preferred class of compounds falling within the scope of the above-described general formula are complex metal chlorocyanurates where, as noted above, X is a chlorine atom. Such preferred compounds are characterized in having a limited but effective solubility in water of from about 0.5 to about 6.0 grams per 100 ml. of water depending upon the particular compound. The compounds of this invention when crystallized from aqueous solutions are usually obtained as octa-hydrates, that is, one molecule of the crystalline hydrate contains 8 molecules of water bound in the crystalline lattice. Depending upon the particular compound and whether the compound is in the anhydrous or a hydrated form, the preferred compounds of this invention generally have an available chlorine content of from about 47% to about 64% and are exceptionally stable when incorporated in certain hereinafter described compositions and provide the oxidizing, bleaching, sterilizing and/or disinfecting action in such compositions.

The preferred compounds of this invention generally decompose without melting at temperatures in the range of from about 190° C. to 250° C.

Preferred compounds of this invention are anhydrous or hydrated mono-magnesium, di-potassium tetra(dichlorocyanurate), mono-zinc, di-potassium tetra(dichlorocyanurate), mono-magnesium, di-rubidium tetra (dichlorocyanurate) and mono-zinc, di-rubidium tetra (dichlorocyanurate). Anhydrous mono-magnesium, di-potassium tetra(dichlorocyanurate) is characterized in being soluble to an extent of about 4.2 grams per 100 ml. of water at 25° C. and in having a molecular weight of about 890.4 and in also having the following approximate elemental content:

|   | Percent |
|---|---|
| Available chlorine | 63.70 |
| Potassium | 8.80 |
| Magnesium | 2.73 |
| Carbon | 16.20 |
| Nitrogen | 18.90 |
| Oxygen | 21.52 |

Anhydrous mono-zinc di-potassium tetra(dichlorocyanurate) is characterized in being soluble to an extent of about 2.3 grams per 100 ml. of water at 25° C. and in having a molecular weight of about 931.5 and in also having the following approximate elemental content:

|   | Percent |
|---|---|
| Available chlorine | 61.0 |
| Potassium | 8.4 |
| Zinc | 7.01 |
| Carbon | 15.50 |
| Nitrogen | 18.05 |
| Oxygen | 20.55 |

Anhydrous mono-magnesium, di-rubidium tetra(dichlorocyanurate) is characterized in being soluble to an extent of about 4.7 grams per 100 ml. of water at 25° C. and in having a molecular weight of about 983.2 and in also having the following approximate elemental content:

|   | Percent |
|---|---|
| Available chlorine | 57.7 |
| Rubidium | 17.39 |
| Magnesium | 2.47 |
| Carbon | 14.66 |
| Nitrogen | 17.10 |
| Oxygen | 19.53 |

Anhydrous mono-zinc, di-rubidium tetra(dichlorocyanurate) is characterized in being soluble to an extent of about 4.4 grams per 100 ml. of water at 25° C. and in having a molecular weight of about 1,024.2 and in also having the following approximate elemental content:

|  | Percent |
|---|---|
| Available chlorine | 55.4 |
| Rubidium | 16.69 |
| Zinc | 6.38 |
| Carbon | 14.07 |
| Nitrogen | 16.41 |
| Oxygen | 18.75 |

The novel compounds of this invention may be prepared, in general, by a process which comprises reacting in an aqueous medium a halocyanurate, potassium and/or rubidium ions, and magnesium and/or zinc ions. By so proceeding, a complex dimetal tetra(dihalocyanurate) forms in and usually precipitates from the aqueous medium.

Examples of halocyanurates which may be employed in the above process include tri- and di-halocyanuric acids such as, for example, tribromo-, trichloro-, tri-iodo- and tri-fluorocyanuric acids and the corresponding dihalocyanuric acids and metal salts of the dihalocyanuric acids. Examples of such metal salts include, for example, lithium, sodium, potassium, calcium, barium, strontium, magnesium, zinc, etc. dihalocyanurates. As will be hereinafter evident the above-described potassium and/or rubidium and magnesium and/or zinc ions employed in the processes of this invention are usually provided in the aqueous medium by water-soluble metal salts of such metals.

The novel complex chlorocyanurate compounds of this invention may be prepared by a process which comprises reacting, in an aqueous medium, a chlorocyanuric acid, a metal salt of dichlorocyanuric acid or a mixture of a chlorocyanuric acid and a metal salt thereof and potassium and/or rubidium ions and magnesium and/or zinc ions. By so proceeding a solid hydrated compound falling within the scope of the above-described general formula forms in and precipitates from the aqueous medium.

In the above process the potassium and/or rubidium ions may be generally furnished by the hydroxide or by any water-soluble metal salt of potassium or rubidium. Generally water-soluble salts which do not undergo or are incapable of undergoing a substantial oxidation-reduction reaction with dichlorocyanuric acid, metal salts of dichlorocyanuric acid or mixtures thereof are preferred. Examples of such water-soluble potassium and rubidium salts include potassium and/or rubidium chloride, nitrate, sulfate, carbonate, bicarbonate, acetate and the like. Alternatively, these metal ions may also be provided in the aqueous medium using the potassium or rubidium salt of dichlorocyanuric acid.

In the process of this invention the divalent magnesium and/or zinc ions may generally be furnished by watersoluble salt of magnesium or zinc. Generally watersoluble salts which do not undergo or are incapable of undergoing a substantial oxidation-reduction reaction with dichlorocyanuric acid, metal salts of dichlorocyanuric acid or mixtures thereof are preferred. Examples of such water-soluble magnesium or zinc salts include magnesium or zinc chloride, nitrate, sulfate, acetate and the like. Alternatively, these metal ions may also be provided in the aqueous medium by using a zinc and/or magnesium salt of dichlorocyanuric acid.

The compounds of this invention may be prepared by a process (included within the scope of the process previously described herein) which comprises reacting potassium or rubidium dichlorocyanurate with magnesium and/or zinc dichlorocyanurate in an aqueous medium. Thus, for example, when potassium and/or rubidium dichlorocyanurate is reacted with magnesium di(dichlorocyanurate) in an aqueous medium, hydrated mono-magnesium di-potassium tetra(dichlorocyanurate) and/or the corresponding di-rubidium salt or mixtures thereof will form in and precipitate from the aqueous medium. In the case of mixtures, the di-potassium salt usually precipitates preferentially. Also, when potassium or rubidium dichlorocyanurate is reacted with zinc di(dichlorocyanurate) in an aqueous medium, mono-zinc, di-potassium tetra(dichlorocyanurate) or the corresponding di-rubidium salt will be formed and precipitate. When potassium or rubidium dichlorocyanurate is reacted with a mixture of magnesium and zinc di(dichlorocyanurate) a mixture of complex salts will usually form. However, in such instance mono-zinc, di-potassium (or di-rubidium) tetra(dichlorocyanurate) will form preferentially and if insufficient potassium dichlorocyanurate is present in the aqueous medium, little if any of the monomagnesium salts will be formed.

The preferred compounds of this invention may also be prepared by reacting dichlorocyanuric acid and a water-soluble inorganic salt of potassium and/or rubidium and a water-soluble salt of magnesium and/or zinc. Alternatively, metal salts of dichlorocyanuric acid, other than potassium, rubidium, magnesium or zinc dichlorocyanurate, may be reacted with an inorganic water-soluble potassium and/or rubidium salt and a water-soluble magnesium or zinc salt. Such metal salts of dichlorocyanuric acid include, for example, the lithium, sodium, calcium, barium and strontium salts.

It has been found preferable, in preparing the compounds of this invention, to react potassium and/or rubidium dichlorocyanurate in an aqueous medium with a water-soluble magnesium or zinc salt which is incapable of undergoing a substantial oxidation-reduction reaction with dichlorocyanurates, such as, for example, magnesium or zinc chloride, sulfate, nitrate or acetate.

The amount of any of the previously described reactants employed may vary from dilute solutions, e.g., 0.1% by weight of each reactant, preferably up to saturated solutions thereof. Generally speaking, maximum yields are obtained when the reactants are added to the aqueous medium in concentrations in excess of the amount theoretically required, but not in excess of the solubility of the reactant. Thus, the upper limit of the amount of a reactant employed will generally depend on the water solubility of the reactant. When lesser, that is dilute, amounts of reactants are employed, the compounds of this invention will not precipitate unless the aqueous medium is concentrated by evaporation to the point of insolubility of the particular compound being prepared.

By way of example, when potassium or rubidium dichlorocyanurate is reacted with magnesium or zinc dichlorocyanurate, it is preferred that the maximum amount of each reactant added to the aqueous medium is that amount which would provide a saturated solution of such compound in the aqueous medium. When a reagent has a high water solubility such as, for example, when potassium dichlorocyanurate is reacted with magnesium sulfate which has a relatively high solubility in water, the amount of the potassium salt most advantageously employed will be the amount which would provide a saturated solution of the salt and the amount of magnesium sulfate may vary from a dilute solution up to an amount sufficient to provide a saturated solution of the magnesium sulfate.

While it is possible to prepare the compounds of this invention by employing reactants in amounts in excess of their water solubilities, there is usually little advantage to such procedure and the precipitate formed will often comprise a mixture of unreacted chlorocyanurate and the complex chlorocyanurate compound. The reactants can usually be added to the aqueous medium as dry powder or in the form of solutions and may, in general, be added in any order.

The aqueous medium employed preferably comprises water in which the appropriate reagents are dissolved. However, if desirable, the aqueous medium may also comprise dilute aqueous solutions of water and dilute alcohols such as, for example, methyl, ethyl or propyl alcohol.

Generally speaking, the compounds of this invention may be readily prepared at room temperature although the temperature of the aqueous medium may be in the range of from just above the freezing point to as high as 80° C. When lower temperatures are employed, a greater amount of precipitated material is usually formed. When higher temperatures are employed, it is usually necessary to cool the solution after the reaction is completed to obtain maximum yields.

The pH of the aqueous medium may vary widely but is usually at, or is maintained at, a pH in the range of from about 4.0 to about 10. When the pH of the aqueous medium falls or is permitted to fall somewhat below 4, a mixture of dichlorocyanuric acid and the desired compound will usually be formed. When the pH of the medium falls below 3.5, dichlorocyanuric acid is usually the only precipitate obtained. If the pH of the aqueous medium rises or is permitted to rise above pH 10, some decomposition of the triazine ring of the chlorocyanurate will usually occur resulting in the production of highly noxious nitrogen chlorides which may be toxic and constitute an explosive material. When the pH of the medium falls below 4.0, such as, for example, when dichlorocyanuric acid is reacted with a water-soluble zinc salt and a water-soluble potassium or rubidium salt, the pH of the medium may be adjusted to a pH within the desired range by the addition of suitable amounts of a water-soluble alkaline material such as, for example, sodium or lithium hydroxide or carbonate or bicarbonate. When the pH of the aqueous medium rises above 10.0 such as, for example, when magnesium dichlorocyanurate is reacted with potassium hydroxide or potassium carbonate, the pH of the medium may be properly adjusted by the addition of an acid such as, for example, hydrochloric, nitric or acetic acid.

The compounds of this invention may also be prepared by processes which comprise halogenating, for example, chlorinating, mixtures of, for example, tripotassium and/or di-potassium cyanurate and zinc di-cyanurate and/or magnesium. Tri-rubidium and/or di-rubidium cyanurate may be used with or instead of the potassium cyanurates. However, such processes are less preferable than those hereinbefore described.

As mentioned previously herein, the novel compounds of this invention are usually formed in and precipitate from the aqueous medium as a hydrate, usually as the octahydrate, from which they can be readily separated by well-known methods such as filtration, sedimentation, decantation, centrifugation and the like.

When in the hydrate form the chlorine containing compounds are white crystalline materials. As will be evident from the specific examples, both of the di-rubidium salts have a common distinct X-ray diffraction pattern and the di-potassium salts have a common X-ray diffraction pattern which is distinct, but different from the X-ray diffraction pattern of the di-rubidium salts. This is surprising in view of the different divalent metals (e.g., magnesium and zinc) in the compounds and it is believed that this occurs because the magnesium and/or zinc atoms are surrounded or shielded by dichlorocyanurate molecules as set forth in the general formula previously described herein. The compounds of this invention may be dried to the anhydrous state and they then lose their crystalline character and become amorphous.

It is also surprising that other alkali metals such as sodium, lithium or cesium do not form complex chlorocyanurate compounds when used with zinc or magnesium in the processes which form the complex compounds of this invention. It is even more surprising and unexpected that divalent metals, other than magnesium or zinc do not form complex chlorocyanurate compounds when reacted with the potassium and rubidium salts as herein described.

Also, as will be evident hereinafter, the complex chlorocyanurate compounds of this invention are unexpectedly more stable, when incorporated in formulations for use in bleaching, sterilizing, oxidizing or disinfecting operations than the potassium, rubidium, magnesium and zinc salts of dichlorocyanuric acid per se or than sodium dichlorocyanurate or di- or trichlorocyanuric acid.

Any of the novel complex metal halocyanurate compounds of this invention may be mixed with a wide variety of inorganic and/or organic compounds to provide compositions which are effective for use in, for example, bleaching, sterilizing, oxidizing and/or disinfecting operations. A class of compounds which, when mixed with such inorganic and organic compounds, provide remarkably stable compositions are the complex metal chlorocyanurate compounds hereinbefore described. In general, it is preferable that the inorganic compounds be incapable of undergoing an oxidation-reduction reaction with the chlorocyanurate compounds.

Examples of inorganic compounds which may be employed in such compositions include alkaline, water-soluble, alkali metal inorganic salts, preferably those alkaline inorganic salts of this class which are employed as detergent builders. Illustrative of such salts are trialkali metal phosphates such as trisodium phosphate and tripotassium phosphate; di-alkali metal hydrogen phosphates such as di-sodium hydrogen phosphate and di-potassium hydrogen phosphate; alkaline, water-soluble, molecularly dehydrated alkali metal phosphate salts such as alkali metal pyrophosphates, for example, tetra sodium pyrophosphate, trisodium hydrogen pyrophosphate and tetra-potassium pyrophosphate, and the alkali metal tripolyphosphates such as sodium tripolyphosphate ($Na_5P_3O_{10}$) and potassium tripolyphosphate; alkaline, water-soluble alkali metal metaphosphates such as sodium hexametaphosphate; water-soluble, alkali metal silicates such as sodium silicates having an $Na_2O$ to $SiO_2$ mol ratio of 1:1 to 1:3.6, preferably 1:1 to 1:1.35, and the corresponding potassium silicates; water-soluble, alkali metal borates such as calcined sodium tetraborate or borax; water soluble alkali metal carbonates or bicarbonates such as sodium or potassium carbonates or bicarbonates; and the like. These salts can be used alone or in various combinations with each other or with water-soluble, neutral, inert diluents, which may also have some detergent building properties, for example, water-soluble inert neutral alkali metal salt diluents such as neutral alkali metal sulfates or chlorides, for example, sodium sulfate or sodium chloride.

The proportions of the aforementioned alkaline or neutral salts which may be employed in the compositions of this invention can be varied considerably, depending upon the end use of the composition. However, when used, such salts comprise in excess of about 40% and up to about 90% by weight of the dry solids content of the composition. Of this the alkaline alkali metal salts usually comprise about 10% to 95% of the total salts (other than the chlorocyanurate compounds) and the inert diluent neutral salts usually comprise about 90% to about 5% of the total salts.

Although the compositions of this invention may comprise the complex halocyanurates per se, the compositions may also contain, alone or in combination with the above-described salts, relatively minor amounts, usually less than 15% by weight, preferably 1 to 10% by weight, on a solid basis, of perfume or odor masking agents such as essential oils, organic sequestering or chelating agents such as the metal salts of ethylenediamine tetra-acetic acid; organic dyes and coloring agents such as those described in Venkataraman, "Chemistry of Synthetic Dyes," Academic Press, Inc., New York, 1952; organic stain, corrosion, or tarnish inhibitors such as those described in U.S. Patents 2,618,603, 2,618,605, 2,618,606, 2,618,607 and 2,618,608; surface active agents such as foaming agents, detergents, emulsifiers and the like; and mixtures thereof.

In this latter category of surface active agents, particularly non-soap synthetic organic detergents, there can be included the anionic surfactants, such as the sulfated and the sulfonated alkyl, aryl, and alkylaryl hydrocarbons set forth in U.S. Patent 2,846,398, line 54 of column 3 to line 6 of column 5. These can also be included nonionic surfactants such as those set forth in column 5 of U.S. Patent 2,846,398 and well-known cationic surfactants.

The portion of U.S. Patent 2,846,398 relating to certain preferred organic surface active agents which have been found to be particularly advantageous in the compositions of this invention appears in column 4, lines 35 to 75 and column 5, lines 1 to 74 and are quoted below.

"The organic anionic detergents of this invention include in addition to the preferred alkali metal fatty acid soaps the well-known surface-active alkali metal sulfonates and sulfates, which may be employed as the sole detergent base or in admixture with the alkali metal fatty acid soaps (e.g. one part of the fatty acid soap to 0.5 to 2 parts by weight of the surface-active alkali metal sulfonate or sulfate or mixture thereof) as the detergent base. A preferred group of this class is the long chain alkyl aryl sulfonates, i.e. those wherein the alkyl radical is straight or branched in structure and contains from 8 to 22 carbon atoms, but preferably 10 to 16 carbon atoms, examples of which being octyl, decyl, dodecyl, keryl, pentadecyl, hexadecyl, octadecyl, mixed long chain alkyls derived from long chain fatty materials such as the lauryl radical, cracked paraffin wax olefins, polymers of lower mono-olefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

"Other sulfonate surface-active agents are contemplated also, e.g. the long chain alkyl sulfonates such as sodium hexadecane sulfonate and sodium octadecane sulfonate.

"The well-known sulfate detergents having 12 to 26 carbon atoms and particularly those having an acyl radical of about 8 to 22 carbons atoms may be employed as anionic detergents bases in accordance with this invention. Such detergents include the sulfuric acid esters of polyhydric alcohols incompletely esterified with fatty acid, e.g. sodium cocoanut oil monoglyceride monosulfate, sodium tallow diglyceride monosulfate, the pure and mixed higher alkyl sulfates such as sodium lauryl sulfate and sodium cetyl sulfate.

"Additional anionic surface-active sulfonates and sulfates contemplated by this invention are the sulfated and sulfonated alkyl acid amides such as Igepon T

$(C_{17}H_{33}CO \cdot NHCH_2CH_2SO_3Na)$ the sulfated and sulfonated esters such as Igepon AP ($RCOOCH_2SO_3Na$ where R is an alkyl radical containing from 12 to 18 carbon atoms), sodium salt of the bisulfate of a dialkyl dicarboxylate, sodium salt of the sulfonic acid derivative of a dialkyl dicarboxylate, sodium sulfosuccinic esters such as

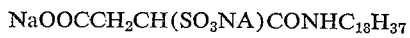
$NaOOCCH_2CH(SO_3NA)CONHC_{18}H_{37}$ and the like.

"The nonionic surface-active agents contemplated are viscous liquid to wax-like water-soluble surface-active substances containing a polyglycol ether group of the structure

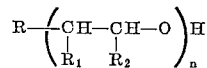
$$R-\left(\begin{array}{c} CH-CH-O \\ | \quad | \\ R_1 \quad R_2 \end{array}\right)_n H$$

wherein $R_1$ and $R_2$ are hydrogen or short chain alkyl, where $n$ is an integer greater than 3, and where R is a residue of a compound of a monomeric organic compound having an active hydrogen, e.g. alcohols, phenols, amides, primary amines, secondary amines, carboxylic acids, etc. These nonionic detergents are well known (note U.S. 1,970,578 and U.S. 2,213,477) and may be typified by the polyalkylene oxide derivatives (i.e. polyethylene oxide, polypropylene oxide, polybutylene oxide) of water-insoluble higher fatty acids, such as lauric, oleic, palmitic and stearic acid and the like or mixtures thereof, such as the mixtures of fatty acids obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e. the alcohols corresponding to the fatty acids specified above or mixtures thereof), oil or phenols, particularly alkyl phenols containing at least six alkyl carbon atoms such as isooctyl-, di-tertiary butyl-, triisopropyl-, nonyl, dodecyl-, octadecyl- phenols or naphthols, or of higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful nonionic detergent is that obtained by condensing one mol of tall oil with 5 to 15 mols of ethylene oxide."

Other typical examples of these categories of the anionic and non-ionic surface active agents are described in Schwartz and Perry, "Surface Active Agents," Interscience Publishers, New York (1949) and "The Journal of American Oil Chemists Society," vol. 34, No. 4, pages 170–216 (April 1957). In order to avoid the enlargement of the present specification, the subject matter of all the aforementioned publications including the aforementioned patents, i.e. 2,618,603; 2,618,605; 2,618,606; 2,618,607; 2,618,608; and 2,846,398, is incorporated herein by reference.

The various ingredients employed in the compositions of this invention can be used in various proportions depending on whether the composition is to be used as a bleaching composition, a sanitizing composition, a detergent composition or the like. However, when all three types of ingredients are used, the amount of inorganic compounds, e.g. neutral to alkaline detergent builder and/or diluent salts, is usually in excess of 50% by weight of the composition and the total combined weight of complex metal chlorocyanurate and organic compound, usually an organic surface active agent, is preferably less than the weight of the inorganic compound. When aqueous compositions are desired the ingredients are normally present in the composition on the same solids basis, but the compositions may contain from 50% to 99% by weight of water.

In one embodiment of this invention, the novel compositions comprise on a solids basis an inorganic compound and from about 0.1 to about 98% by weight of any of the novel chlorocyanurate compounds of this invention. The inorganic compound employed may be any of the inorganic compounds previously described herein or mixtures thereof, but is preferably a detergent builder salt or mixture of salts such as a neutral and/or alkaline alkali metal and/or an alkaline earth metal phosphate, silicate, sulfate and aluminate salts and is more preferably a mixture of sodium tripolyphosphate, sodium sulfate and sodium metasilicate.

In another embodiment of this invention, the novel compositions comprise a mixture of one or more of the complex metal chlorocyanurates of this invention and from about 0.1 to about 25% by weight of an additional organic compound, usually an organic surface active agent, preferably an anionic organic surface active agent, more preferably a sodium alkyl benezene sulfonate containing from 10 to 16 carbon atoms. Such compositions are particularly useful as household bleaches and sanitizers.

In still another embodiment of this invention, the novel compositions comprise a mixture of one or more of the complex metal chlorocyanurates of this invention, an organic surface active agent, preferably a sodium alkyl benzene sulfonate, wherein the alkyl radical is a straight or branched chain containing from 10 to 16 carbon atoms, sodium tripolyphosphate, sodium sulfate and sodium metasilicate. In such compositions the metal chlorocyanurate and the sodium alkyl benzene sulfonate together are preferably present in an amount of from about 0.1% to about 10% by weight of the composition.

As previously noted, the proportions and kind of ingredients will depend on the purpose for which the formulation or composition is being used, that is, whether it is being used for bleaching, laundering, sanitizing purposes, etc. Regardless of the use involved, however, the compositions containing the novel complex metal chlorocyanurate compounds of this invention are remarkably stable with respect to retention of available chlorine under storage conditions for prolonged periods of time, that is, for periods up to six months or longer.

A further understanding of the compounds, processes and compositions of this invention will be obtained from the following specific examples which are intended to illustrate the invention, but not to limit the scope thereof, parts and percentages being by weight unless otherwise indicated.

*Example I*

Three hundred thirty-six grams of powdered dichlorocyanuric acid and 72 grams of powdered magnesium carbonate were added with agitation to 10 liters of water at 25° C. in a reaction vessel until complete solution occurred. The pH of the resulting solution was 6.7. To this solution was added, while agitation was continued, 110 grams of crystalline rubidium chloride dissolved in 100 ml. of water. The aqueous medium was thus provided with magnesium and rubidium ions. During the addition of the rubidium chloride, a crystalline precipitate formed in the reaction vessel. After the addition of the rubidium chloride was completed, stirring was discontinued and the aqueous liquid in the reaction vessel was permitted to stand for 6 hours during which time additional precipitate formed in and settled to the bottom of the reaction vessel. Thereafter the liquid was removed from the reaction vessel by decantation, the precipitated solids were washed with cold (5° C.) water and dried in an oven at 90° C. A yield of 50 grams of a white crystalline material was obtained. Analysis of the liquid for available chlorine, magnesium and rubidium showed it to consist of an aqueous solution of a further 400 grams of product of which 190 grams were recovered by concentrating the solution at a temperature of 20° C. A portion of the crystals were further dried at 150° C. for 6 hours to constant weight during which time the crystals lost their crystalline character and became an amorphous powder. The amount of water lost during the last mentioned drying operation showed that the crystals contained 12.8% water. Elemental analysis of this anhydrous material for Mg, Rb, C, N and available chlorine showed that the elemental content produced values which corresponded substantially to values for mono-magnesium di-rubidium, tetra(dichlorocyanurate) having the general empirical formula $MgRb_2(Cl_2C_3N_3O_3)_4$ and the water content of the crystalline material initially obtained corresponded to that of an octahydrate of the above compound.

The actual elemental content compared with the theoretical elemental content of anhydrous mono-magnesium di-rubidium tetra(dichlorocyanurate) is given below:

| Element | Actual (Found) (Percent) | Theoretical (Percent) |
|---|---|---|
| Magnesium | 2.17 | 2.47 |
| Rubidium | 17.4 | 17.39 |
| Carbon | 14.29 | 14.66 |
| Nitrogen | 17.09 | 17.10 |
| Available chlorine | 55.0 | 57.7 |

X-ray diffraction analysis of the crystalline hydrate material was conducted using nickel filtered copper K alpha radiation at a wave length of 1.54050 Angstroms. The X-ray diffraction pattern (with intensities of 10% and greater) was as follows:

| Interplanar spacing (d) Angstroms | Relative intensity Percent |
|---|---|
| 4.019 | 100 |
| 3.336 | 77 |
| 3.025 | 55 |
| 4.149 | 36 |
| 2.562 | 35 |
| 2.004 | 34 |
| 5.211 | 34 |
| 8.036 | 31 |
| 2.210 | 29 |
| 2.308 | 26 |
| 3.218 | 24 |
| 2.938 | 20 |
| 2.688 | 20 |
| 2.605 | 19 |
| 4.818 | 18 |
| 5.500 | 15 |
| 4.979 | 10 |
| 4.766 | 10 |
| 2.130 | 10 |
| 2.384 | 10 |
| 4.436 | 10 |

*Example II*

Seven hundred twenty-five grams of crystalline sodium dichlorocyanurate were dissolved in 10 liters of water at 25° C. in a reaction vessel. To this solution and with agitation, there was added 310 grams of crystalline potassium sulfate and 210 grams of crystalline zinc nitrate to provide ions of potassium and zinc in the aqueous medium. During the addition of these reagents to the solution, a crystalline precipitate formed in the reaction vessel. After the addition of the reagents was completed, agitation was discontinued and the liquid in the reaction vessel was cooled to 10° C. and allowed to stand for 6 hours during which time additional precipitate formed in the liquid and settled to the bottom of the reaction vessel. Thereafter the precipitated solids were separated from the liquid by filtration and washed with cold (5° C.) water and dried in an oven at 90° C. A yield of 570 grams of a white crystalline material was obtained. Analysis of the liquid for available chlorine, potassium and zinc showed it to contain a further 230 grams of product in solution of which about 120 grams were recovered by further evaporation. A portion of the crystals was further dried to constant weight at a temperature of 150° C. during which time the crystals lost their crystalline character and the product became an amorphous powder. The amount of water lost during the last mentioned drying operation showed that the crystals contained 13.4% of water. Elemental analysis of this anhydrous material for Zn, K, C, N and available chlorine showed values which corresponded substantially to values for mono-zinc, di-potassium tetra(dichlorocyanurate) having the general empirical formula $ZnK_2(Cl_2C_3N_3O_3)_4$ and the water content of the crystalline material corresponded to that of an octahydrate of such compound.

The actual elemental content compared with the theoretical elemental content of anhydrous mono-zinc, di-potassium tetra(dichlorocyanurate) is given below.

| Element | Actual (Found) (Percent) | Theoretical (Percent) |
|---|---|---|
| Zinc | 7.05 | 7.01 |
| Potassium | 8.55 | 8.40 |
| Carbon | 15.6 | 15.5 |
| Nitrogen | 18.01 | 18.05 |
| Available chlorine | 57.2 | 61.0 |

X-ray diffraction analysis of the crystalline hydrolyzed material was obtained using the procedure described in Example I. The X-ray diffraction (with intensities of 5% and greater) was as follows:

| Interplanar spacing (d) Angstroms: | Relative intensity, percent |
|---|---|
| 3.264 | 100 |
| 7.964 | 85 |
| 4.001 | 62 |
| 2.576 | 53 |
| 4.092 | 49 |
| 5.151 | 34 |
| 2.000 | 34 |
| 3.140 | 27 |
| 3.035 | 12 |
| 2.291 | 9 |
| 2.910 | 9 |
| 4.818 | 8 |
| 4.308 | 7 |
| 2.665 | 7 |
| 2.378 | 5 |

It is evident that the X-ray diffraction pattern of the compound of this example is distinct and different from the X-ray diffraction pattern of the compound of Example I.

*Example III*

Eight hundred grams of crystalline potassium dichlorocyanurate were dissolved in 10 liters of water at 35° C. in a reaction vessel. To this solution there was added with agitation 125 grams of crystalline magnesium acetate dissolved in 100 ml. of warm water. The reaction vessel thus consisted of an aqueous medium containing potassium and magnesium ions. During the addition of magnesium acetate, a crystalline precipitate formed in the reaction vessel. After completing the addition, agitation was discontinued and the liquid in the reaction vessel was cooled to 5° C. and allowed to stand for 5 hours during which time additional precipitate formed in the liquid and settled to the bottom of the reaction vessel. Thereafter the precipitated solids were separated from the liquid by filtration and washed with cold (5° C.) water and dried in an oven at 90° C. A yield of 410 grams of a white crystalline material was obtained. Analysis of the liquid for available chlorine showed it to contain a further 450 grams of dissolved product, 400 grams of which were recovered by further concentration of the liquid. A portion of the crystals was further dried to constant weight at a temperature of 130° C. during which time the crystals lost their crystalline character and became an amorphous powder. The amount of water lost during the last mentioned drying step showed that the crystals contained 13.9% of water. Elemental analysis of this anhydrous material for Mg, K, C, N and available chlorine showed values which corresponded substantially to values for mono-magnesium, dipotassium tetra(dichlorocyanurate) having the general empirical formula $MgK_2(Cl_2C_3N_3O_3)_4$ and the water content of the crystalline material corresponded to that of an octahydrate of such compound.

The actual elemental content, compared with the theoretical elemental content of mono-magnesium, dipotassium tetra(dichlorocyanurate) is given below:

| Element | Actual (Found) (Percent) | Theoretical (Percent) |
|---|---|---|
| Magnesium | 2.65 | 2.73 |
| Potassium | 9.05 | 8.8 |
| Carbon | 16.1 | 16.2 |
| Nitrogen | 17.9 | 18.9 |
| Available chlorine | 62.5 | 62.7 |

X-ray diffraction analysis of the crystalline hydrated material was obtained using the procedure described in Example I. The X-ray diffraction pattern was substantially the diffraction pattern obtained for the compound of Example I indicating that the magnesium atom in the compound of Example II and the magnesium atom in the compound of this example are probably surrounded in each instance by bonded dichlorocyanurate molecules in a manner such as, for example, in the general structural formula previously described.

Mono-magnesium dipotassium tetra-(dibromocyanurate) was prepared by reacting potassium dibromocyanurate and magnesium acetate in the manner described for the chloro compound.

*Example IV*

Six hundred grams of zinc di(dichlorocyanurate) were dissolved in 10 liters of water at 35° C. in a reaction vessel. To this solution there was added with agitation 160 grams of crystalline rubidium chloride. The solution thus conatined zinc and rubidium ions. During the addition of the rubidium chloride, a crystalline precipitate formed in the reaction vessel. After completing the addition, agitation was discontinued and the liquid in the reaction vessel was cooled to 10° C., and allowed to stand for 6 hours during which time additional precipitate formed in the liquid and settled to the bottom of the reaction vessel. Thereafter the precipitated solids were separated from the liquid by filtration and washed with cold (5° C.) water and dried in an oven at 90° C. A yield of 360 grams of a white crystalline material was obtained. Analysis of the liquid for available chlorine showed it to consist of an aqueous solution of a further 380 grams of product, 300 grams of which were recovered by concentration.

A portion of the crystals was further dried to constant weight at a temperature of 135° C. during which time the crystals lost their crystalline character and became an amorphous powder. The amount of water lost during the last mentioned drying operation was 12.3% of the original weight of the crystals. Elemental analysis of the anhydrous material for Zn, Rb, C, N and available chlorine produced values which corresponded to those values for mono-zinc di-rubidium tetra(dichlorocyanurate) having the general empirical formula $ZnRb_2(Cl_2C_3N_3O_3)_4$ and the water content of the crystalline material corresponded to that of an octahydrate of the above compound.

The actual elemental content compared with the theoretical elemental content of mono-zinc di-rubidium tetra(dichlorocyanurate) is given below:

| Element | Actual (Found) (Percent) | Theoretical (Percent) |
|---|---|---|
| Zinc | 6.40 | 6.38 |
| Rubidium | 16.71 | 16.69 |
| Carbon | 14.43 | 14.07 |
| Nitrogen | 16.43 | 16.41 |
| Available chlorine | 54.4 | 55.4 |

X-ray diffraction analysis was obtained using the procedure of Example I. The X-ray diffraction pattern was substantially the diffraction pattern obtained for the compound of Example I indicating that the magnesium atom of the compound of Example I and the zinc atom in the compound of this example are probably surrounded in each instance by bonded dichlorocyanurate molecules in a manner such as, for example, in the general structural formula previously described.

Mono-zinc di-rubidium tetra(dibromocyanurate) was prepared by reacting zinc di(bromocyanurate) with rubidium sulfate in accordance with the process above described.

*Example V*

Three hundred sixty grams of potassium dichlorocyanurate were dissolved in 4 liters of water at 25° C. in a reaction vessel. To this solution there was added with agitation 350 grams of zinc di(dichlorocyanurate) dissolved in 6 liters of water at 25° C. The solution thus contained potassium and zinc ions. During the addition of the zinc salt, a crystalline precipitate formed in the reaction vessel. After completing the addition, agitation was discontinued and the liquid in the reaction vessel was cooled to 10° C. and allowed to stand for 6 hours during which time additional precipitate formed in the liquid and settled to the bottom of the reaction vessel. Thereafter the precipitated solids were separated from the liquid by filtration and washed with cold (5° C.) water and dried in an oven at 90° C. A yield of 590 grams of crystalline mono-zinc di-potassium tetra(dichlorocyanurate) octahydrate was obtained. This material had the same X-ray diffraction pattern as the material of Example II. When dried to the anhydrous form, it became amorphous and had the same elemental content as the compound of Example II.

*Example VI*

Dry mixed compositions in the percentages given in Tables I and II were prepared.

TABLE I

| Ingredient | Composition Number | | | | | |
|---|---|---|---|---|---|---|
| | 1 | 2 | 3 | 4 | 5 | 6 |
| $MgK_2(Cl_2C_3N_3O_3)_4$ | 8.0 | | | | | |
| $MgRb_2(Cl_2C_3N_3O_3)_4$ | | 4.0 | | | | |
| $ZnK_2(Cl_2C_3N_3O_3)_4$ | | | 6.0 | | | 1.0 |
| $ZnRb_2(Cl_2C_3N_3O_3)_4$ | | | | 10 | | |
| $MgK_2(Br_2C_3N_3O_3)_4$ | | | | | 4.0 | |
| Sodium tripolyphosphate | 40 | 23 | 50 | 45 | 30.0 | 30.0 |
| Sodium sulfate | 52 | 30 | | 40 | 20 | |
| Sodium carbonate | | 30 | 29.0 | | 22.5 | |
| Sodium silicate | | | 13.0 | | 10 | |
| Silica | | | | | | 64.5 |
| Sodium dodecylbenzene sulfonate | | 3 | 2.0 | 5 | 3.5 | 4.5 |

TABLE II

| Ingredient | Composition Number | | | | | |
|---|---|---|---|---|---|---|
| | 7 | 8 | 9 | 10 | 11 | 12 |
| $K(Cl_2C_3N_3O_4)$ | 8.0 | | | | | |
| $Rb(Cl_2C_3N_3O_3)$ | | 4.0 | | | | |
| $Zn(Cl_2C_3N_3O_3)_2$ | | | 6.0 | | | 1.0 |
| $Mg(Cl_2C_3N_3O_3)_2$ | | | | 10.0 | | |
| $Na(Cl_2C_3N_3O_3)$ | | | | | 4.0 | |
| Sodium tripolyphosphate | 40 | 23 | 50.0 | 45.0 | 30.0 | 30.0 |
| Sodium sulfate | 52 | 30 | | 40.0 | 20.0 | |
| Sodium carbonate | | 30 | 29 | | 22.5 | |
| Sodium silicate | | | 13.0 | | 10 | |
| Silica | | | | | | 64.5 |
| Sodium dodecylbenzene sulfonate | | 3 | 2.0 | 5.0 | 3.5 | 4.5 |

Compositions 1, 4, 7 and 10 when dissolved in water effectively bleached stain from textiles. Compositions 2, 3, 8 and 9 when dissolved in water were effective as cleaning and whitening compositions when employed in laundering operations. Compositions 8 and 11 were effective, when dissolved in water, and combined bleaching, laundering and sanitizing operations. Compositions 6 and 12 were effective bleaching and scouring powders.

*Example VII*

Ten grams of each of the compositions of Example VI were placed in separate open vials and stored in an oven maintained at 90° F. and 85% relative humidity for the times indicated in Table III. The available chlorine content of each of the compositions was determined immediately prior to and after the storage of the compositions and the percent loss of available chlorine was calculated and are shown in Table III. It is evident from the data that compositions 1 through 6 containing the novel complex chlorocyanurate compounds of this invention lost significantly less available chlorine than compositions containing precursor noncomplexed chlorocyanurate compounds.

TABLE III

| Composition Number | Storage Time, Days | Loss of Available Chlorine, percent |
|---|---|---|
| 1 | 6 | 11 |
| 2 | 15 | 35 |
| 3 | 15 | 18 |
| 4 | 10 | 6 |
| 5 | 20 | 5 |
| 6 | 6 | 11 |
| 7 | 6 | 22 |
| 8 | 15 | 68 |
| 9 | 15 | 62 |
| 10 | 10 | 18 |
| 11 | 20 | 24 |
| 12 | 6 | 21 |

From the foregoing, it is evident that compositions 1 through 6, each containing one of the novel complex halocyanurates hereindescribed are remarkably stable to loss of available chlorine when compared with the stability of other chlorocyanurate compounds (compositions 7 through 12) when stored under the same conditions for corresponding periods of time.

What is claimed is:
1. A composition consisting essentially of a mixture of an inorganic compound selected from the group consisting of silica and alkali metal phosphates, silicates, borates, carbonates, bicarbonates, sulfates, chlorides, and mixtures thereof, and a complex metal halocyanurate having the general formula

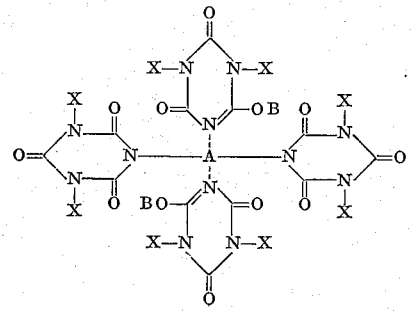

where A is a divalent metal selected from the group consisting of magnesium and zinc and B is an alkali metal selected from the group consisting of potassium and rubidium and X is a halogen atom, and hydrates; the said halocyanurate being present in an amount in the range of from about 0.1% to about 98% by weight of the mixture thereof.

2. A composition as in claim 1 wherein the complex metal halocyanurate is a complex metal chlorocyanurate having the general formula

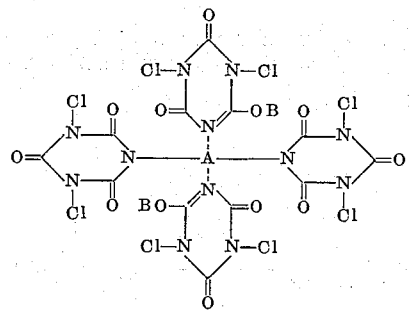

where A is a divalent metal selected from the group consisting of magnesium and zinc; B is an alkali metal selected from the group consisting of potassium and rubidium, and hydrates thereof.

3. A composition as in claim 1 wherein the inorganic compound is an inorganic detergent builder alkali metal phosphate.

4. A composition consisting essentially of a mixture of a complex metal chlorocyanurate having the general formula

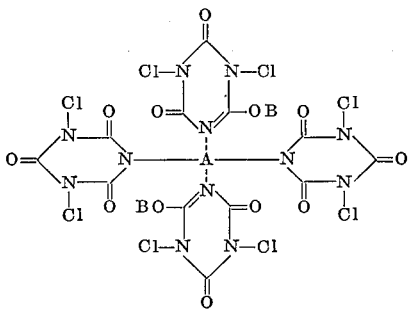

where A is a divalent metal selected from the group consisting of magnesium and zinc; B is an alkali metal selected from the group consisting of potassium and rubidium, and hydrates thereof and a nonsoap synthetic organic detergent selected from the group consisting of nonsoap synthetic anionic surface active agents and nonsoap synthetic nonionic surface active agents, said nonsoap synthetic organic detergent being present in an amount in the range of from about 0.1% to about 25% by weight of said mixture.

5. A sterilizing oxidizing and bleaching composition consisting essentially of (a) a complex metal chlorocyanurate having the general formula

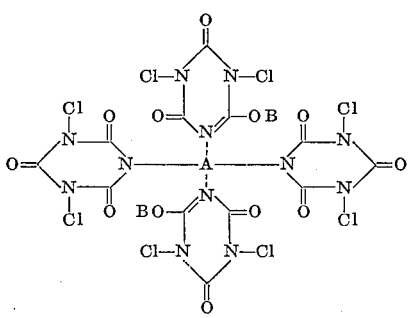

where A is a divalent metal selected from the group consisting of magnesium and zinc; B is an alkali metal selected from the group consisting of potassium and rubidium, and hydrates thereof, (b) an inorganic compound selected from the group consisting of neutral and alkaline, alkali metal phosphates, silicates, sulfates, aluminates, and mixtures thereof, and (c) a nonsoap synthetic anionic surface active agent, said metal chlorocyanurate and said surface active agent together being present in a total amount of from about 0.1 to 10% by weight of said composition.

6. A composition of matter consisting essentially of (a) a complex metal chlorocyanurate having the general formula

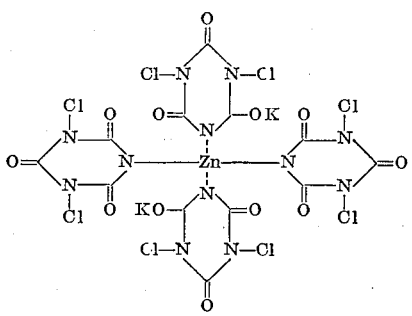

B is an alkali metal selected from the group consisting of potassium and rubidium, and hydrates thereof, (b) a sodium alkylbenzene sulfonate wherein the alkyl radical is a straight chain containing from 10 to 16 carbon atoms, (c) sodium tripolyphosphate, (d) sodium sulfate and (e) sodium metasilicate, said metal chlorocyanurate and said sodium alkylbenzene sulfonate together being present in an amount of from about 0.1% to about 10% by weight of said composition and items (c), (d), and (e) together being present in an amount of from about 40% to about 90% by weight, based upon the total weight of said composition.

7. A composition consisting essentially of (a) from about 40% to about 90% by weight, based on the weight of the composition, of an inorganic compound selected from the group consisting of silica and alkali metal phosphates, silicates, borates, carbonates, bicarbonates, sulfates, chlorides, and mixtures thereof, (b) from about 0.1% to about 25% by weight, based upon the weight of the composition, of a nonsoap synthetic organic detergent selected from the group consisting of nonsoap synthetic anionic surface active agents and nonsoap synthetic nonionic surface active agents, and (c) a complex metal chlorocyanurate having the general formula

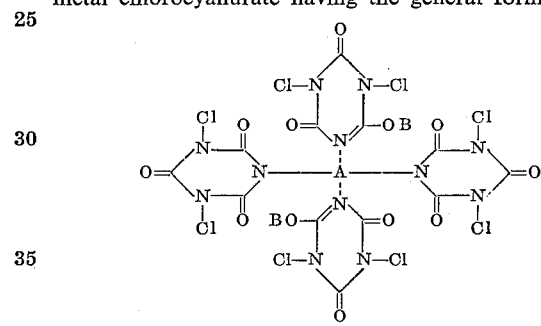

where A is a divalent metal selected from the group consisting of magnesium and zinc; B is an alkali metal selected from the group consisting of potassium and rubidium, and hydrates thereof, said inorganic compound being incapable of undergoing an oxidation reduction reaction with said metal chlorocyanurate.

8. A bleaching, laundering and sanitizing composition consisting essentially of (a) mono-magnesium, di-potassium tetra (dichlorocyanurate), (b) sodium tripolyphosphate and (c) sodium sulfate; said cyanurate being present in an amount of from about 0.1% to about 98% by weight of said composition.

9. A bleaching, laundering and sanitizing composition consisting essentially of (a) mono-zinc, di-potassium tetra (dichlorocyanurate), (b) sodium dodecyl benzene sulfonate, (c) sodium tripolyphosphate, and (d) silica; items (a) and (b) together being present in an amount of from about 0.1% to about 10% by weight of said composition.

References Cited by the Examiner

UNITED STATES PATENTS

| | | |
|---|---|---|
| 2,913,460 | 11/1959 | Brown et al. _____ 252—99 XR |
| 3,072,654 | 1/1963 | Vazopolos _____ 252—99 XR |
| 3,094,525 | 6/1963 | Marek _____ 252—187 XR |
| 3,115,493 | 12/1963 | Marek _____ 252—187 |
| 3,150,132 | 9/1964 | Symes. |
| 3,157,649 | 11/1964 | Symes _____ 252—99 XR |

LEON D. ROSDOL, Primary Examiner.

JULIUS GREENWALD, Examiner.

M. WEINBLATT, Assistant Examiner.

UNITED STATES PATENT OFFICE
CERTIFICATE OF CORRECTION

Patent No. 3,294,690                        December 27, 1966

Edwin A. Matzner

It is hereby certified that error appears in the above numbered patent requiring correction and that the said Letters Patent should read as corrected below.

Column 11, lines 74 and 75, strike out "tion of the zinc salt, a crystalline precipitate formed in the reaction vessel. After completing the addition, agi-" and insert instead -- tially identical to that of the diffraction pattern obtained for the compound of Example II indicating that the zinc --.

Signed and sealed this 28th day of November 1967.

(SEAL)
Attest:

Edward M. Fletcher, Jr.                         EDWARD J. BRENNER

Attesting Officer                              Commissioner of Patents